(No Model.)

W. J. McELROY.
TESTING BOX FOR UNDERGROUND ELECTRIC CABLES.

No. 284,139. Patented Aug. 28, 1883.

Witnesses:
C. L. Parker
R. H. Whittesey

Inventor: William J. McElroy
By Attorney George H. Christy

UNITED STATES PATENT OFFICE.

WILLIAM J. McELROY, OF PITTSBURG, PENNSYLVANIA, ASSIGNOR TO THE STANDARD CABLE COMPANY, OF NEW JERSEY.

TESTING-BOX FOR UNDERGROUND ELECTRIC CABLES.

SPECIFICATION forming part of Letters Patent No. 284,139, dated August 28, 1883.

Application filed February 24, 1883. (No model.)

*To all whom it may concern:*

Be it known that I, WILLIAM J. McELROY, a citizen of the United States, residing at Pittsburg, county of Allegheny, State of Pennsylvania, have invented or discovered a new and useful Improvement in Testing-Boxes for Underground Electric Cables; and I do hereby declare the following to be a full, clear, concise, and exact description thereof, reference being had to the accompanying drawings, making a part of this specification, in which—like letters indicating like parts—

Figure 1:
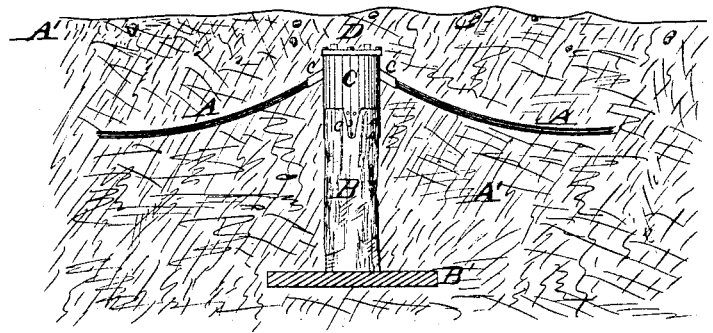
Figure 2:
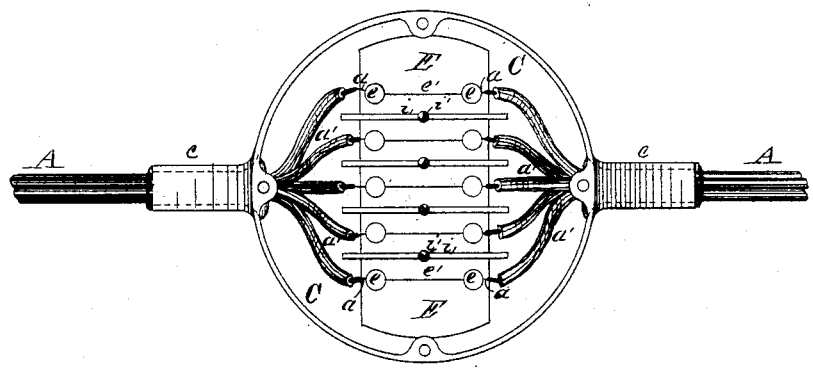
Figure 3:
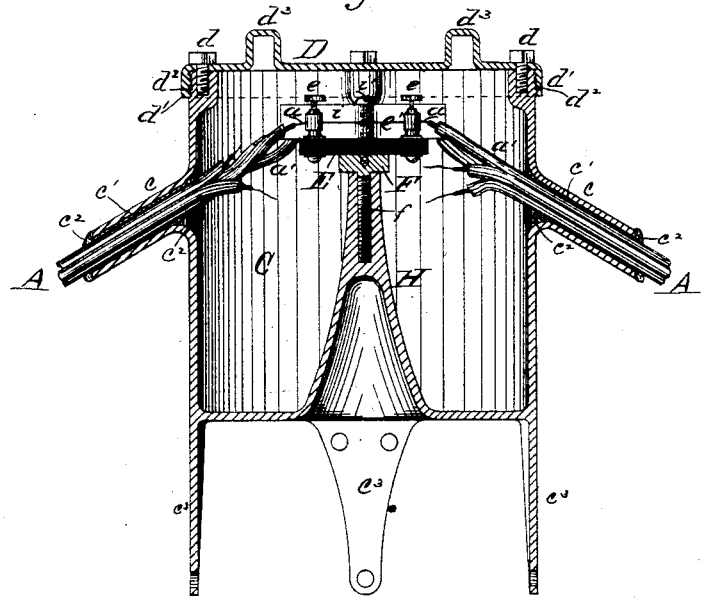

Figure 1 is a view in elevation illustrative of my improved testing box or station. Fig. 2 is a top plan view, the cover of the box being removed; and Fig. 3 is a vertical sectional view.

My invention relates to certain improvements in testing-boxes for underground cables or electric conductors; and in general terms it consists in certain combinations of a cast-iron box or case having downwardly-inclined tubular openings on its sides for entrance of the cable, with a removable cap or cover, a supporting-block, an inclosed insulated board or stand, with provision for connecting the separate wires of the cable across the board and for preventing interference by induction between the exposed parts of the conductors, as hereinafter more fully described and claimed.

In the drawings, A', Fig. 1, represents a section of earth in which is laid an electric cable, A. The cable shown is of the class known in the art as "lead-covered," having insulated conducting-wires $a$ inclosed within separate tubular passages in the body of lead covering. I do not wish, however, to limit the application of my invention to cables of this class, as it may, if desired, be employed with underground cables of other kinds. The testing-box with which such cable is connected in my present invention is formed of a metal case, C, by preference of cylindrical form, having on its sides downwardly extending or inclined tubular openings $c$ $c$, designed to admit the end of the cable into the interior of the case and afford an extended bearing-surface, with reference both to making a secure attachment or connection, and also to preventing abrasion or wearing away of the cable at the point of entering the box or case.

In order to make devices of this class easily accessible, it is customary to set them near the surface, where they may be subjected to considerable movement. If the cable be passed into the box through a simple hole in the side, it is difficult to secure the cable so that it will not break loose and open a leak; but by extending the tube or sleeve $c$ from the side of the case, as shown, this difficulty is effectually overcome; also, by inclining these tubes downward provision is made for raising the cable near to the surface as it enters the box without unnecessary exposure of other points.

In order to make secure connection or attachment of the cable to the case, the tubular passage surrounding the cable may be filled with solder or lead, as at $c'$; or the tube and cable may be soldered together at the outer or inner end, or both, as at $c^2$.

The ends of the cable within the case are subdivided longitudinally into separate lead-covered strands $a'$, the ends of the inclosed conductors $a$ being denuded and secured in binding-posts $e$, which are set or secured on a bed, E, of hard rubber or other good electric insulating material, electric connection being made across this bed or board by wires $e'$, secured in opposite posts. The insulating-bed E rests upon a metal plate, F, which latter is secured by screw $f$ with a metal post, H, raised in the center of the case or in its inclosed chamber.

In order to prevent the evil effects of induction due to the exposure of the wires across the bed or board E, metal plates $i$ are secured on its upper face by screws $i'$, which extend through the bed and screw into tapped holes in the metal plate F, whereby the plates $i$ have electrical connection with ground. These plates $i$ are by preference about double the height of the wires $e'$ above the bed, and in length they extend in either direction to or a little beyond the ends of the lead armor of the strands $a'$, thereby separating the wires through the whole of their exposed part or connections. These plates by their presence will intercept the lines of force between wires and will protect each wire from induction by reason of its proximity to other wires electrically excited. Any currents which may be induced in the plates $i$ will be conducted to ground through the metallic connections provided, as above described.

The case or box is closed at the top by a removable cap or cover, D, secured by screw-bolts $d$, or, if preferred, by screw-threaded flange $d'$, run upon the corresponding thread, $d^2$, on the rim of the case by a spanner or other suitable tool applied to the raised ribs $d^3$.

If desired, a gasket may be placed between the cover and the rim of the case to pack the joint and prevent leakage. In order to support the case or box firmly and prevent movement, it is seated on the end of a post, B, and secured thereto by tangs $c^3$, nails being driven through them and into the timber. In fitting the case or box on the post the latter is by preference dressed down to the size and shape of the former, or to a little less size, so that the end of the post may be covered and protected from exposure to moisture and rapid decay. The post may be set in the earth sufficient depth to afford the desired stability; or where this is not practicable it may rest on a base, B', seated on the rock or other firm bed. A stable support may be secured in this way, which will be cheap, desirable, and easily replaced when required.

When it is desired to test any one of the wires of the cable, the earth above the box is thrown aside, the cover D removed, the wire $e'$ disconnected, and the testing apparatus is connected to one or both the posts of such line, as may be desired.

This apparatus is simple and cheap in construction, durable and secure both in protecting the cables at the point of entering the box and also within the box, moisture will be effectually excluded, induction between conductors prevented, and the several conductors be easily accessible for such purposes as may arise in the use of the cable.

I claim herein as my invention—

1. In a cable-testing box, the combination of metal case C, having tubular cable-passages $c$ and removable cover D, a bed, E, of insulating material, secured within the case, binding-post $e$, secured to such bed, and induction-plates $i$ between lines of posts, substantially as set forth.

2. The combination of metal case C, having openings therein for insertion of the cable ends, with inclosed metal support H, metal plate F, secured to the support, bed E, of insulating material, resting on the plate, binding-posts $e$, and induction-plates $i$, substantially as and for the purposes set forth.

3. The case C, having tubular openings $c$ and tangs $c^3$ extending downward therefrom, in combination with post B and cables A, substantially as set forth.

In testimony whereof I have hereunto set my hand.

WILLIAM J. McELROY.

Witnesses:
 R. H. WHITTLESEY,
 C. L. PARKER.